United States Patent [19]
Yanagisawa et al.

[11] Patent Number: 5,424,171
[45] Date of Patent: Jun. 13, 1995

[54] OPTICAL RECORDING MEDIUM

[75] Inventors: Shuichi Yanagisawa; Satoru Tanaka; Fumio Matsui, all of Tsurugashima, Japan

[73] Assignee: Pioneer Electronic Corporation, Tokyo, Japan

[21] Appl. No.: 40,432

[22] Filed: Apr. 1, 1993

[30] Foreign Application Priority Data

Apr. 3, 1992 [JP] Japan .................. 4-082346
Apr. 3, 1992 [JP] Japan .................. 4-082347

[51] Int. Cl.⁶ .............................................. G11B 7/24
[52] U.S. Cl. .................................. 430/271; 430/270; 430/495; 430/945; 346/135.1
[58] Field of Search ............. 430/495, 945, 270, 271; 346/135.1

[56] References Cited
U.S. PATENT DOCUMENTS

| | | | |
|---|---|---|---|
| 4,492,750 | 1/1985 | Law et al. | 430/494 |
| 4,529,688 | 7/1985 | Law et al. | 430/495 |
| 4,798,781 | 1/1989 | Hirose et al. | 430/270 |
| 4,816,386 | 3/1989 | Gotoh et al. | 430/495 |
| 5,024,926 | 6/1991 | Itoh et al. | 430/495 |
| 5,075,203 | 12/1991 | Katayose et al. | 430/495 |
| 5,079,135 | 1/1992 | Matsuzawa et al. | 430/495 |
| 5,248,538 | 9/1993 | Kovacs et al. | 428/64 |
| 5,283,094 | 2/1994 | Sasakawa et al. | 428/64 |

FOREIGN PATENT DOCUMENTS

| | | | |
|---|---|---|---|
| 63-119036 | 5/1988 | Japan | 430/495 |
| 1-110986 | 4/1989 | Japan | 430/495 |
| 1-198391 | 8/1989 | Japan | 430/495 |
| 4-185485 | 7/1992 | Japan | |

*Primary Examiner*—Charles L. Bowers, Jr.
*Assistant Examiner*—John A. McPherson
*Attorney, Agent, or Firm*—Sughrue, Mion, Zinn, Macpeak & Seas

[57] ABSTRACT

An optical recording medium provided with: a light transmissive substrate; and a recording film and a reflective film which are formed on the light transmissive substrate. The recording film includes phthalocyanine dye expressed by the following general expression [I],

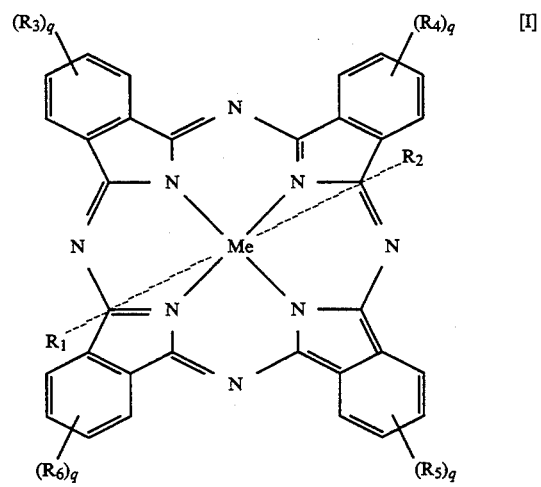

wherein $R_1$ and $R_2$ represent either of hydrogen, hydroxyl group, alkoxyl group, and straight chained or side chained alkyl group, respectively, $R_3$ to $R_6$ represent either of substituted or non-substituted alkyl group, sulfino group, amino group, or sulfonic acid group, respectively, q represents the number of substituents and is the integer of 0 to 4, and Me represents a metal atom.

4 Claims, 5 Drawing Sheets

F I G. 3
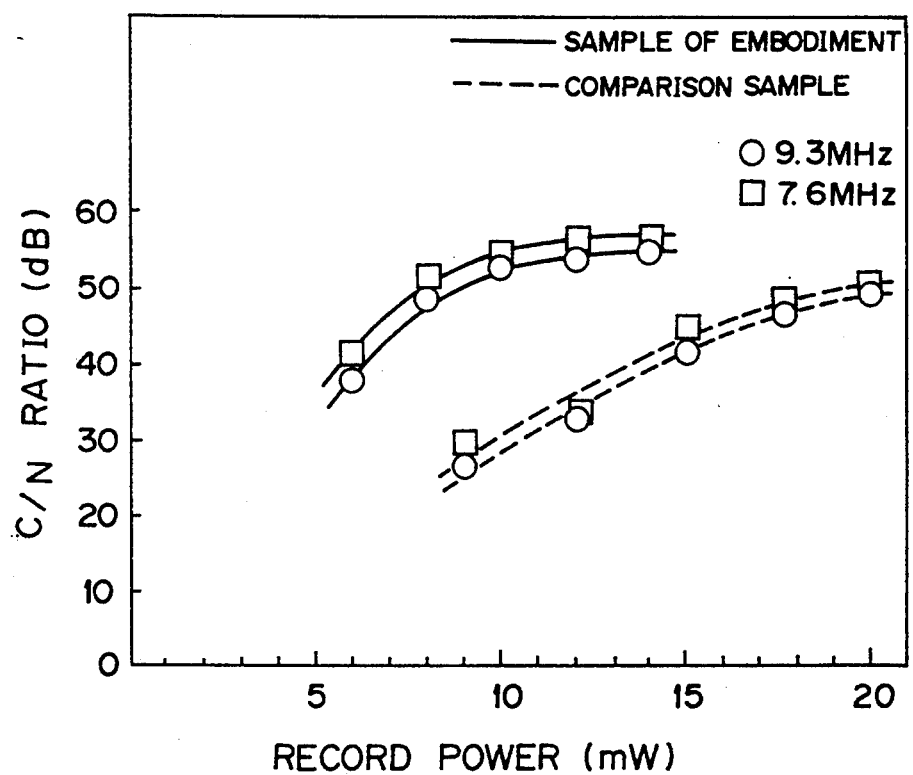

OPTICAL RECORDING MEDIUM

BACKGROUND OF THE INVENTION

1. Field of the Invention

The present invention is related with an optical recording medium. More specifically, it is related with an optical recording medium, to which an analog signal can be recorded, and which can be reproduced by, for example, a LD (Laser Disc) player on the market.

2. Description of the Related Art

In recent years, an optical recording medium, onto which signals can be written once and which can be reproduced by a so-called CD (Compact Disc) player for public use, is marketed. Generally, a cyanine dye is used for the recording film of such a writable optical recording medium of CD type. A digital signal is recorded as a record signal to this type of recording medium.

On the other hand, commercialization of a writable recording medium, as for a so-called LD (Laser Disc) onto which analog signals, such as an image signal and a voice signal, are to be recorded, is also demanded, as in the case of the above-mentioned CD.

However, if an analog signal is recorded by use of a semiconductor laser on the recording film using a cyanine dye as composition of the recording film in the LD recording medium, the sensitivity runs short due to a high linear velocity. Therefore, recording cannot be performed by use of a practical power in this case. Moreover, unlike the case of a digital signal, the influence of a jitter etc. cannot be disregarded in this case. Therefore, as image recording technique, the above-mentioned technique cannot be put into a practical use.

On the other hand, there is another method of image recording, which employs a gas laser of a relatively short wavelength and relatively high output level, and a composite recording film of an aniline series dye and a binder. According to this method, recording can be performed satisfactorily to some extent. However, a recording apparatus becomes very large-scale in this case. Therefore, the possibility to commercialize this method, is very little.

SUMMARY OF THE INVENTION

It is therefore, an object of the present invention to provide an optical recording medium, onto which an analog NTSC (National Television System Committee) image signal can be recorded by use of a simple semiconductor laser in a recording apparatus, under such a condition that a C/N (Carrier to Noise) ratio is high and a jitter is little, and which can be reproduced by a LD player etc. on the market.

According to the present invention, the above-mentioned object can be achieved by an optical recording medium, provided with: a light transmissive substrate; and a recording film and a reflective film which are formed on the light transmissive substrate. The recording film includes phthalocyanine dye expressed by the following general expression [I] or naphthalocyanine dye expressed by the following general expression [II],

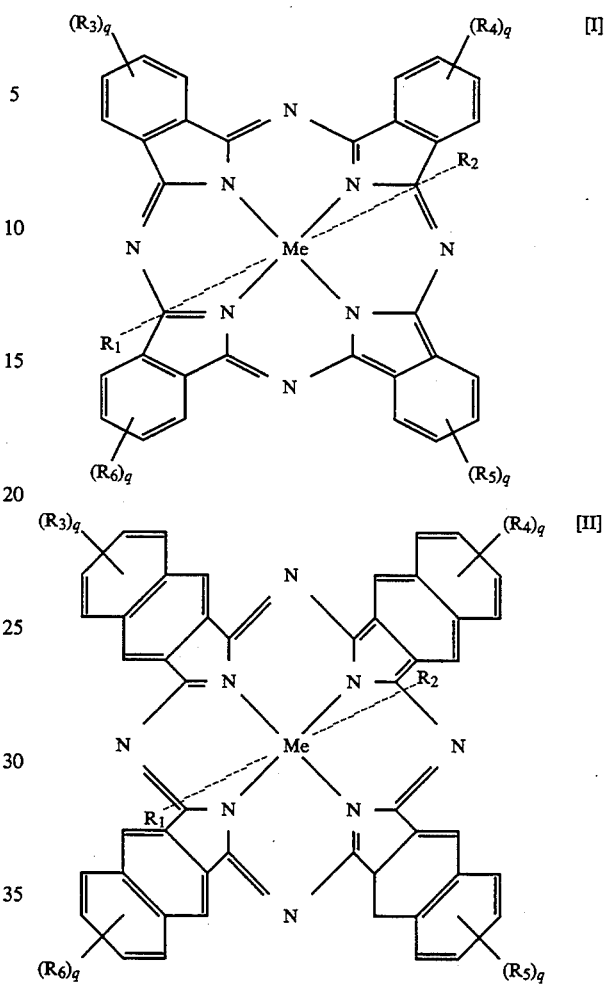

wherein $R_1$ and $R_2$ represent either of hydrogen, hydroxyl group, alkoxyl group, and straight chained or side chained alkyl group, respectively, $R_3$ to $R_6$ represent either of substituted or non-substituted alkyl group, sulfino group, amino group, or sulfonic acid group, respectively, q represents the number of substituents and is the integer of 0 to 4, and Me represents a metal atom.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a graph showing C/N ratios of the sample of the first embodiment and the comparison sample;

DETAILED DESCRIPTION OF THE PREFERRED EMBODIMENTS

The first embodiment of the present invention will be explained hereinbelow, with referring to FIGS. 1 to 4.

Figure 1:
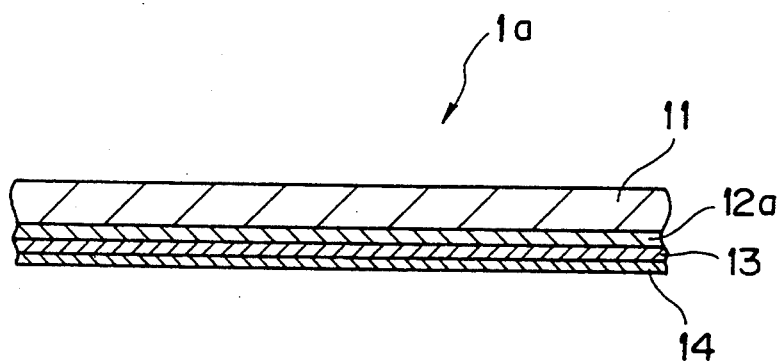
FIG. 1 is a cross-sectional view schematically showing an example of an optical recording medium as a first embodiment according to the present invention.

FIG. 1 is the cross-sectional view which shows the outline of the optical recording medium of the first embodiment.

As shown in FIG. 1, an optical recording medium 1a has a light transmissive substrate 11. A recording film 12a is formed on one side of the light transmissive substrate 11. On the recording film 12a, a reflective film 13 and a protection film 14 are formed in this order from the side of the recording film 12a.

From the viewpoint of the improvement in productivity, a so-called injection-molding resin substrate is preferably used as the light transmissive substrate 11. As the injection-molding material, for example, light transmissive resins, such as polycarbonate resin (PC) and a poly methyl methacrylate (PMMA), are preferably used. Among those materials, the polycarbonate resin (PC) is especially suitable. The thickness of the light transmissive substrate 11 is about 1.1 to 1.4 mm.

The recording film 12a is formed on one side of the light transmissive substrate 11. Here, the recording film 12a contains a phthalocyanine dye as main ingredients.

The phthalocyanine dye contained in the recording film 12a is expressed by the following general expression [I].

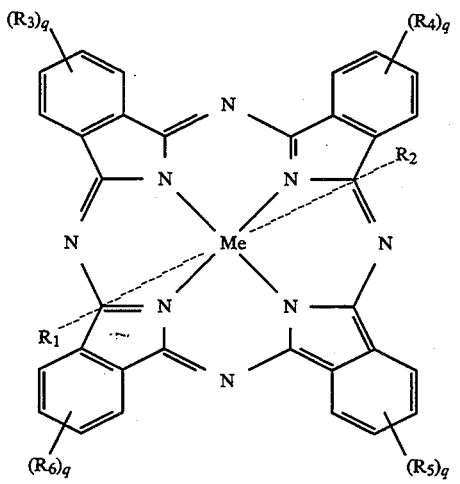

In the general expression [I], $R_1$ and $R_2$ represent either of hydrogen, hydroxyl-group, alkoxyl group, and alkyl group in a straight chain or a side chain, respectively. $R_1$ and $R_2$ may be same to each other or different from each other. Further, only one of $R_1$ and $R_2$ may exists. $R_3$ to $R_6$ represent either of substituted or non-substituted alkyl group, sulfino group, amino group, sulfonic acid group, and halogen, respectively. $R_3$ to $R_6$ may be same to each other, or different from each other. q represents the number of the substituents and is the integer of 0 to 4. When q is not less than two, these substituents may be same to each other or different from each other. Me represents a metal atom. Si, V, Fe, Al, Ga, In, Cu, and Ge, are desirable as Me.

For example, the recording film 12a containing the phthalocyanine dye, is formed on the light transmissive substrate 11 by common means, such as a spinner coating method. The thickness of the recording film 12a to be formed, is about 0.03 to 0.6 micrometers. As the solvent used to form the recording film 12a, there are, for example, diacetone alcohol, 2-ethoxyethanol, 2-methoxyethanol, isophorone, methanol, 2,2,3,3-tetra-fluolo-1-propanol, for example.

The reflective film 13 is formed on the recording film 12a. As the material of the reflective film 13, there are metals, for example, such as gold (Au), silver (Ag), copper (Cu), and aluminum (Al). Among these materials, gold (Au) having a high reflective index, is especially suitable. The reflective film 13 is formed by, for example, a vacuum deposition method, a sputtering method, an ion plating method, etc. as a film formation method.

The thickness of the reflective film 13 is about 0.03 to 0.6 micrometers.

On the reflective film 13, it is desirable to form the protection film 14 to protect the recording film 12a and the reflective film 13.

The protection film 14 is formed by spinner-coating ultraviolet-ray hardening resin and irradiating an ultraviolet ray, so as to harden the resin. Epoxy resin, acrylics resin, silicone resin, urethane resin, etc. may be used for the material of the protection film 14.

The thickness of the protection film 14 is about 1 to 20 micrometers.

In order to protect the light transmissive substrate 11 from the solvent or to increase the optical reflective efficiency, an intermediate layer may be formed between the light transmissive substrate 11 and the recording film 12a. In order to increase the optical absorption efficiency in the recording film 12a, an intermediate layer may be formed between the recording film 12a and the reflective film 13. Namely, in order to improve the record reproduction characteristic or to increase the reliability, a layer made from materials such as SiO₂, SiO₄, MgF, ZnS, PVA, PMMA and a fluorocarbon polymer, may be formed at the substrate surface, between the recording film 12a and the light transmissive substrate 11, between the recording film 12a and the reflective film 13, or between the reflective film 13 and the protection film 14. Alternatively, such a structure may be employed that two optical recording media are bonded together with the protection layer 14 facing inward to each other. In this case, the protection layer 14 may be omitted. In order to bond the optical recording media together, adhesives such as adhesion agent, hot-melting-type adhesive, urethane type adhesive, and epoxy type adhesive may be used.

The optical record method of the present invention will be explained, hereinbelow.

The optical recording medium of the first embodiment mentioned above, is used in the optical record method of the present invention. Concretely, a semiconductor laser beam with a wavelength of 770 to 800 nm, is irradiated onto the optical recording medium from the side of the light transmissive substrate 11. The irradiated laser beam penetrates the light transmissive substrate 11, and reaches the recording film 12a which contains the phthalocyanine dye. When the laser beam reaches the recording film 12a, the phthalocyanine dye change quickly in its condition. At this time, the phthalocyanine dye causes a physical change in the recording film 12a, to form a record pit.

Next, a concrete example of experiment according to the first embodiment, will be explained in detail, hereinbelow.

EXAMPLE 1 OF THE EXPERIMENT

Production of the Sample of the First Embodiment

A recording film is fabricated on the substrate by using the light transmissive substrate 11 which essentially consists of polycarbonate resin with a diameter of 200 mm, and a thickness of 1.25 mm, in the following manner.

Namely, dye application liquid (dye concentration: 60 mg/ml) is spinner-coated on the light transmissive substrate 11. This dye application liquid is prepared by melting the phthalocyanine dye (it is shown in the following structural expression) which is specified by $R_1 = R_2 = OH$, $R_3$ to $R_6 = -SO_2NH(CH_2)_3N(C_2H_5)_2$, $Me = Si$ in the general expression [I] of the phthalocyanine dye, into the solvent of methanol. In this manner, the recording film 12a shown in FIG. 1 is formed.

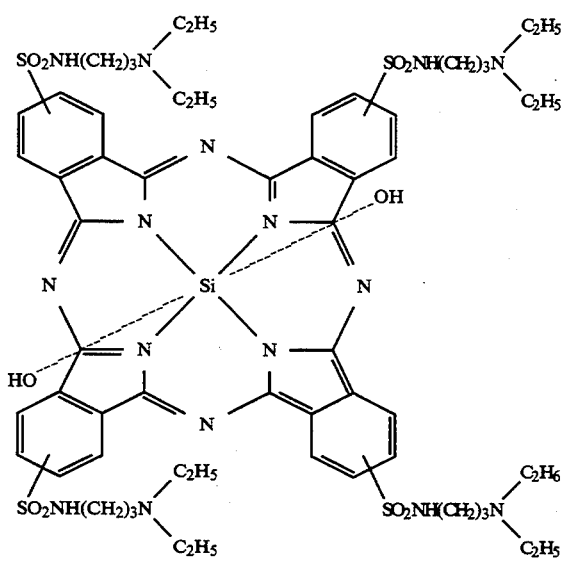

The thickness of the recording film 12a is about 0.2 micrometers.

Furthermore, as shown in FIG. 1, the reflective film 13 of gold (Au) with a thickness of 0.1 micrometers is formed on the recording film 12a by use of a vacuum deposition method.

After that, ultraviolet-ray hardening type resin is spinner-coated on the reflective film 13. The protection film 14 is formed by irradiating the ultraviolet ray to thus coated ultraviolet-ray hardening type resin, to harden it as shown in FIG. 1. The thickness of the protection film 14 is 10 micrometers. As mentioned above in detail, the sample of the first embodiment is produced.

Production of a Comparison Sample

A comparison sample is produced such that the phthalocyanine dye of the recording film composition in the above-mentioned sample of the first embodiment, is replaced by the cyanine dye of the following structural expression [C-1]. The conditions other than that, are same to those of the above-mentioned sample of the first embodiment.

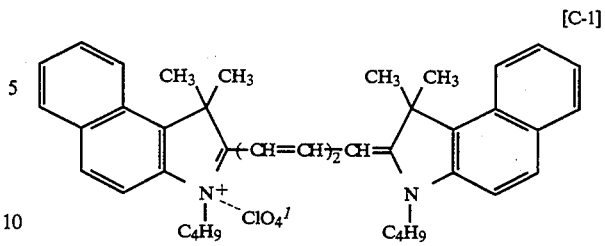

The semiconductor laser beam is irradiated onto the recording film of each samples of the optical recording media, from the side of the light transmissive substrate 11. The semiconductor laser beams are used here which have wavelength of 782 nm and correspond to the image signals of two sorts of record frequencies (9.3 MHz, 7.6 MHz), so that recording of analog signals is performed. At the time of recording, the record power is changed variously in the range from 4 to 20 mW. The jitter, the C/N ratio and RF amplitude after record, are measured. The results are shown in FIGS. 2 to 4.

Figure 2:
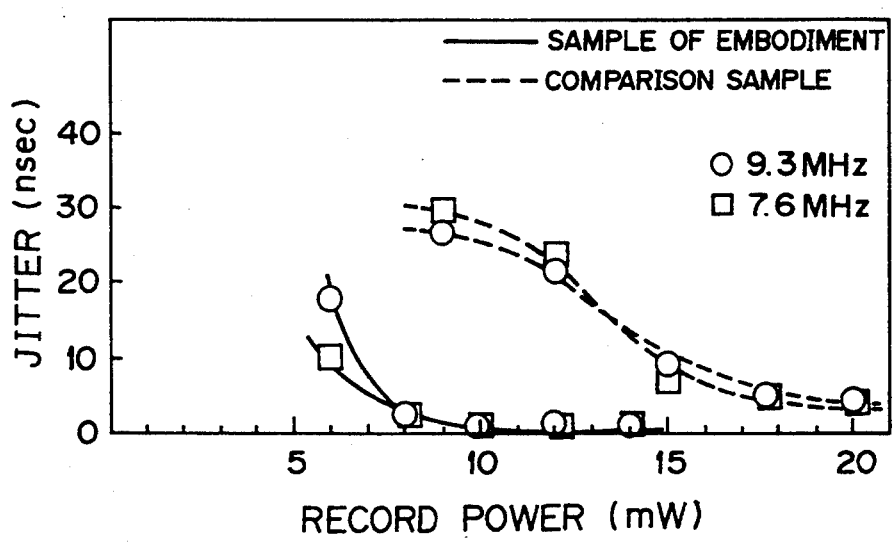
FIG. 2 is a graph showing Jitter values of a sample of the first embodiment and a comparison sample.

As understood from FIG. 2, the sample of the first embodiment has a little jitter value, as indicated by a solid line in the figure, and it is understood that the sample of the first embodiment has an excellent image quality in the reproduced picture. The same kind of results are obtained as for the image signals of two sorts of record frequencies (9.3 MHz, 7.6 MHz).

Further, as understood from FIG.3, the sample of the first embodiment has a high C/N ratio as indicated by a solid line in the figure, and it is understood that the sample of the first embodiment has an excellent image characteristic.

Figure 4:
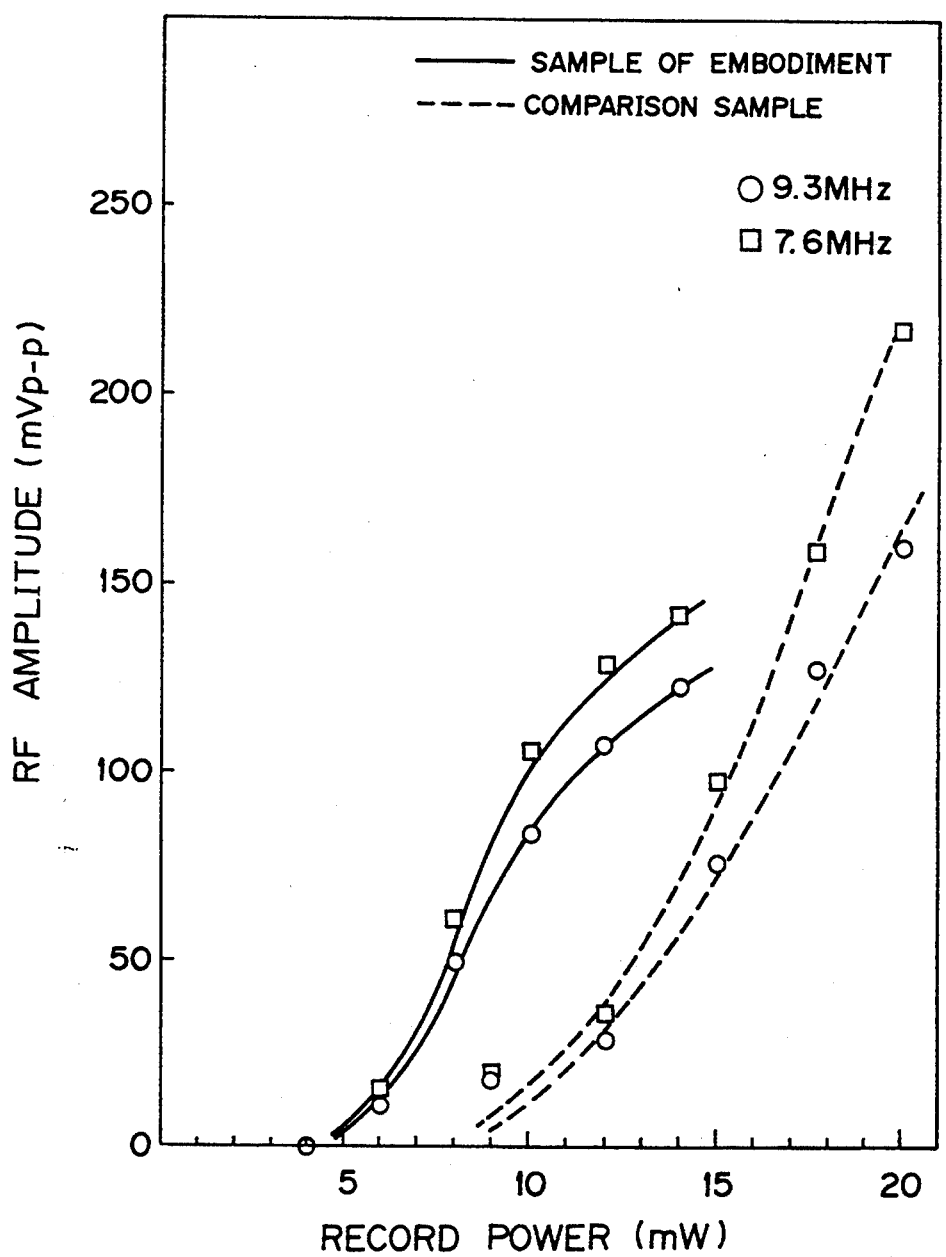
FIG. 4 is a graph showing RF (Radio Frequency) amplitude values of the sample of the first embodiment and the comparison sample.

Moreover, as understood from FIG. 4, the sample of the first embodiment indicated by a solid line in the figure, has a sufficient RF amplitude in the range where the record power is low. Namely, it is understood that the sample of the first embodiment is suitable for writing by use of a low record power. Actually, if the sample of the first embodiment is reproduced by a LD player on the market, the good result of image S/N (Signal to Noise) ratio 45 dB with respect to the input signal of 50% WHITE, is obtained.

Next, the second embodiment according to the present invention will be explained with referring to FIGS. 5 to 7.

Figure 5:
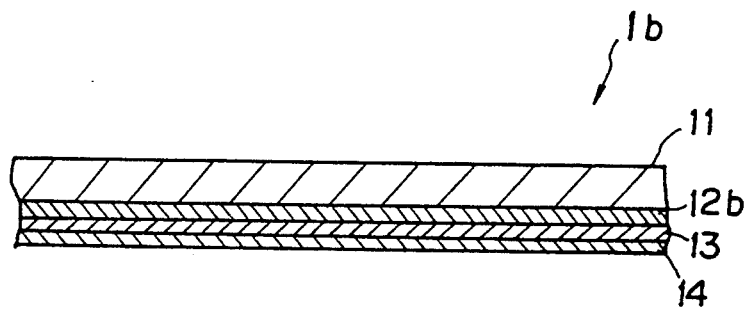
FIG. 5 is a cross-sectional view schematically showing an example of an optical recording medium as a second embodiment according to the present invention.

FIG. 5 is the cross-sectional view which shows the outline of the optical recording medium of the second embodiment.

In FIG. 5, the same elements as those in FIG. 1, carry the same reference numerals and the detailed explanations thereof are omitted.

As shown in FIG. 5, an optical recording medium 1b has a light transmissive substrate 11. A recording film 12b is formed on one side of the light transmissive substrate 11. On the recording film 12b, a reflective film 13 and a protection film 14 are formed in this order from the side of the recording film 12b.

The light transmissive substrate 11, the reflective film 13 and the protection film 14 are formed in the same manner of the aforementioned first embodiment.

The recording film 12b is formed on one side of the light transmissive substrate 11. Here, the recording film 12b contains a naphthalocyanine dye as main ingredients.

The naphthalocyanine dye contained in the recording film 12b is expressed by the following general expression [II].

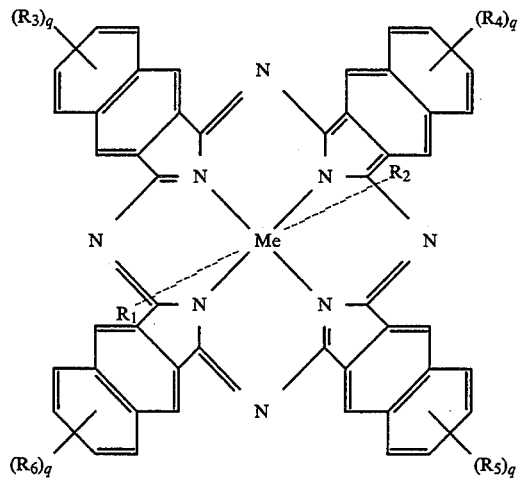

In the general expression [II], $R_1$ and $R_2$ represent either of hydrogen, hydroxyl-group, alkoxyl group, and alkyl group in a straight chain or a side chain, respectively. $R_1$ and $R_2$ may be same to each other or different from each other. Further, only one of $R_1$ and $R_2$ may exists. $R_3$ to $R_6$ represent either of substituted or non-substituted alkyl group, sulfino group, amino group, sulfonic acid group, and halogen, respectively. $R_3$ to $R_6$ may be same to each other, or different from each other. q represents the number of the substituents and is the integer of 0 to 4. When q is not less than two, these substituents may be same to each other or different from each other. Me represents a metal atom. Si, V, Fe, Al, Ga, In, Cu, and Ge, are desirable as Me.

For example, the recording film 12b containing the naphthalocyanine dye, is formed on the light transmissive substrate 11 by common means, such as a spinner coating method. The thickness of the recording film 12b to be formed, is about 0.03 to 0.6 micrometers. As the solvent used to form the recording film 12b, there are, for example, diacetone alcohol, 2-ethoxyethanol, 2-methoxyethanol, isophorone, methanol, 2,2,3,3-tetrafluolo-1-propanol, for example.

On the reflective film 13, it is desirable to form the protection film 14 to protect the recording film 12b and the reflective film 13.

In order to protect the light transmissive substrate 11 from the solvent or to increase the optical reflective efficiency, an intermediate layer may be formed between the light transmissive substrate 11 and the recording film 12b. In order to increase the optical absorption efficiency in the recording film 12b, an intermediate layer may be formed between the recording film 12b and the reflective film 13. Namely, in order to improve the record reproduction characteristic or to increase the reliability, a layer made from materials such as $SiO_2$, $SiO_4$, MgF, ZnS, PVA, PMMA and a fluorocarbon polymer, may be formed at the substrate surface, between the recording film 12b and the light transmissive substrate 11, between the recording film 12b and the reflective film 13, or between the reflective film 13 and the protection film 14. Alternatively, such a structure may be employed that two optical recording media are bonded together with the protection layer 14 facing inward to each other. In this case, the protection layer 14 may be omitted. In order to bond the optical recording media together, adhesives such as adhesion agent, hot-melting-type adhesive, urethane type adhesive, and epoxy type adhesive may be used.

The optical record method of the present invention will be explained, hereinbelow.

The optical recording medium of the second embodiment mentioned above, is used in the optical record method of the present invention in the same manner of the aforementioned first embodiment. Concretely, a semiconductor laser beam with a wavelength of 770 to 800nm, is irradiated onto the optical recording medium from the side of the light transmissive substrate 11. The irradiated laser beam penetrates the light transmissive substrate 11, and reaches the recording film 12b which contains the naphthalocyanine dye. When the laser beam reaches the recording film 12b, the naphthalocyanine dye change quickly in its condition. At this time, the naphthalocyanine dye causes a physical change in the recording film 12b, to form a record pit.

Next, a concrete example of experiment according to the second embodiment, will be explained in detail, hereinbelow.

EXAMPLE 2 OF THE EXPERIMENT

Production of the Sample of the Second Embodiment

A recording film is fabricated on the substrate by using the light transmissive substrate 11 which essentially consists of polycarbonate resin with a diameter of 200 mm, and a thickness of 1.25 mm, in the following manner.

Namely, the recording film 12b as shown in FIG. 5, is formed by spinner-coating the light transmissive substrate 11 with the dye application liquid (dye concentration: 30 mg/ml). This dye application liquid is prepared by melting the naphthalocyanine dye (it is shown in the following expression) specified by $R_1=R_2=CH_3$, $R_3$ to $R_6=C_5H_{11}$ (pentyl group), and Me=Si in the general expression [II] in the above-mentioned naphthalocyanine dye, into the solvent of a 2-ethoxyethanol.

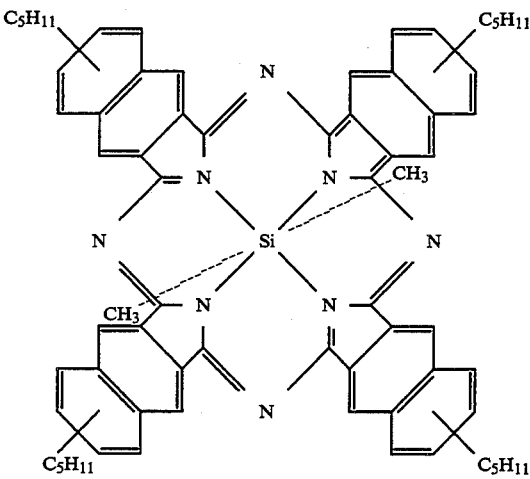

The thickness of the recording film 12b is about 0.2 micrometers.

Furthermore, as shown in FIG. 5, the reflective film 13 of Gold (Au) with a thickness of 0.1 micrometers is formed on the recording film 12b by use of a vacuum deposition method.

After that, ultraviolet-ray hardening type resin is spinner-coated on the reflective film 13. The protection film 14 is formed by irradiating the ultraviolet ray to thus coated ultraviolet-ray hardening type resin, to harden it as shown in FIG. 5. The thickness of the protection film 14 is 10 micrometers. As mentioned above in detail, the sample of the second embodiment is produced.

Production of a Comparison Sample

A comparison sample is produced such that the naphthalocyanine dye of the recording film composition in the above-mentioned sample of the second embodiment, is replaced by the cyanine dye of the aforementioned expression [C-1] in the first embodiment. The conditions other than that, are same to those of the above-mentioned sample of the second embodiment.

The semiconductor laser beam is irradiated onto the recording film of each samples of the optical recording media, from the side of the light transmissive substrate 11. The semiconductor laser beams is used here which have wavelength of 782 nm and correspond to the image signals of record frequency 9.3 MHz, so that recording of analog signals is performed with the linear velocity of 11 m/s. At the time of recording, the record power is changed variously in the range from 4 to 20 mW. The jitter, and the C/N ratio after record, are measured. The results are shown in FIGS. 6 and 7.

Figure 6:
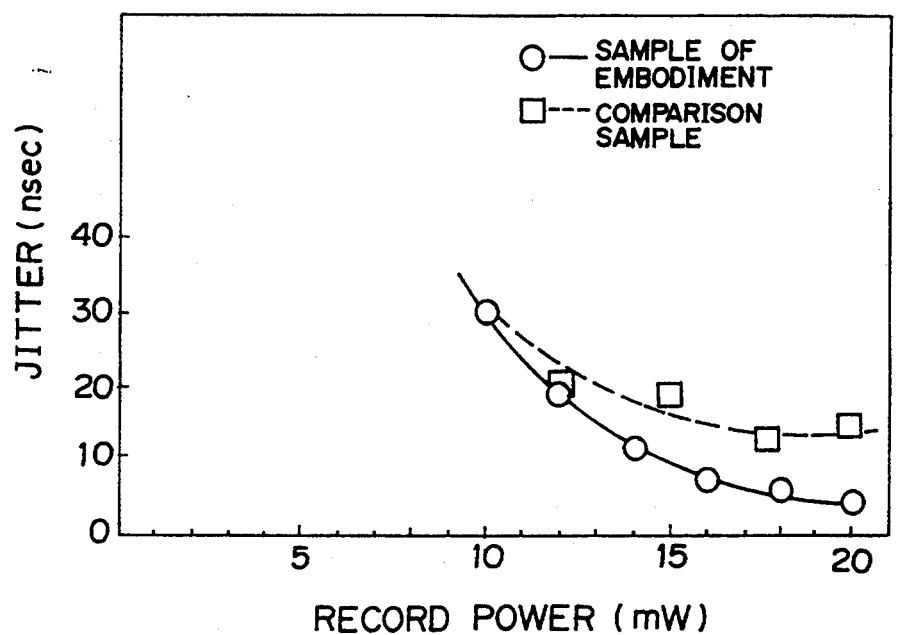
FIG. 6 is a graph showing jitter values of a sample of the second embodiment and a comparison sample.

From FIG. 6, it is understood that the sample of the second embodiment indicated by the solid line has a little jitter value, and thus has an excellent image quality in the reproduced image.

Figure 7:
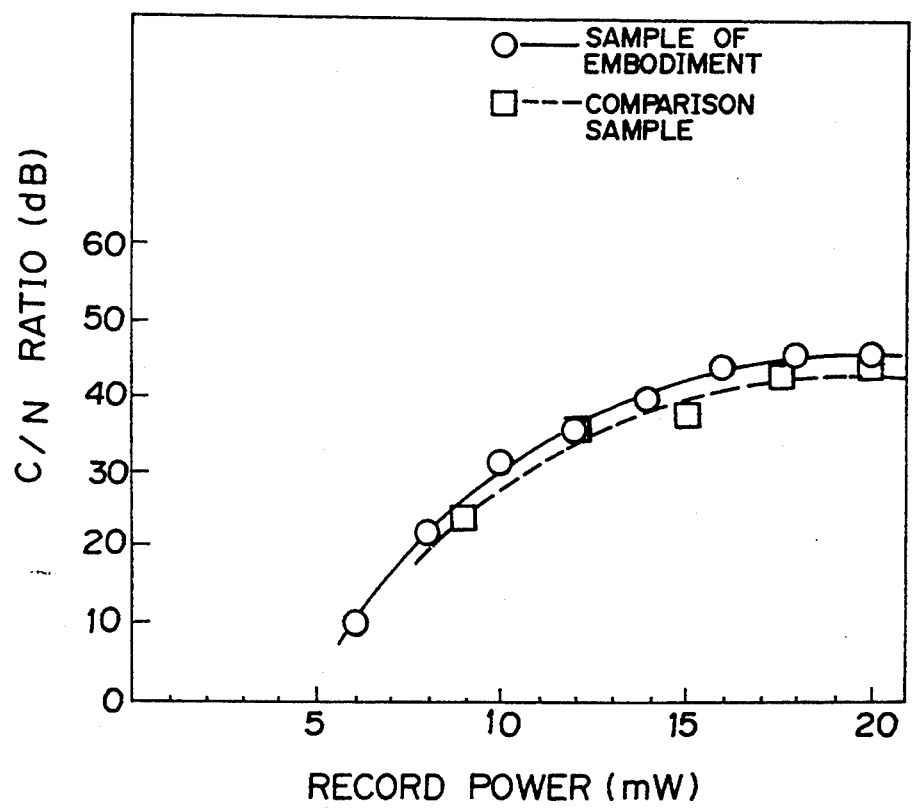
FIG. 7 is a graph showing C/N ratios of the sample of the second embodiment and the comparison sample.

From FIG. 7, it is understood that the sample of the second embodiment indicated by the solid line has a high C/N ratio, and thus has the excellent picture characteristic. Actually, if the sample of the second embodiment is reproduced by a LD player on-the-market, high image S/N ratio is obtained with respect to the input signal of 50% WHITE.

As explained above in detail, the analog NTSC image signal can be recorded and reproduced by use of a rather simple semiconductor laser in a recording apparatus, under such a condition that the C/N ratio is high and the jitter is little, according to the first and second optical recording media of the present invention, so that they can be reproduced by use of a LD player etc. on the market.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical recording medium to be used in a laser disc player comprising:
    a light transmissive substrate; and
    a recording film and a reflective film which are formed on the light transmissive substrate,
wherein said recording film comprises a phthalocyanine dye represented by the following formula:

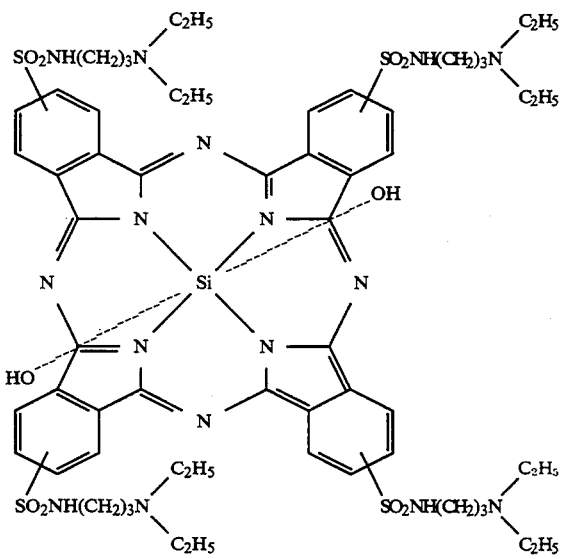

wherein, said light transmissive substrate has a thickness of from 1.1 to 1.4 mm, said recording film has a thickness of from 0.03 to 0.6 μm, and said reflective film has a thickness of from 0.03 to 0.6 μm.

2. An optical recording medium according to claim 1, further comprising a protection film.

3. An optical recording medium to be used in a laser disc player comprising:
    a light transmissive substrate; and
    a recording film and a reflective film which are formed on the light transmissive substrate,
wherein said recording film comprises a naphthalocyanine dye represented by the following general formula:

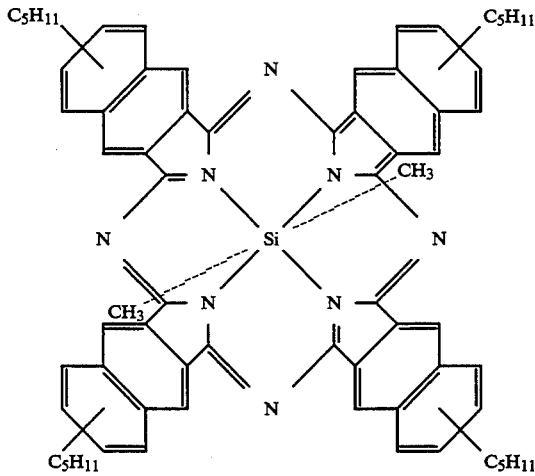

and, wherein, said light transmissive substrate has a thickness of from 1.1 to 1.4 mm, said recording film has a thickness of from 0.03 to 0.6 μm, and said reflective film has a thickness of from 0.03 to 0.6 μm.

4. An optical recording medium according to claim 3, further comprising a protection film.

* * * * *